United States Patent [19]
Angus, Jr.

[11] Patent Number: 5,936,032
[45] Date of Patent: Aug. 10, 1999

[54] TWO COMPONENT FAST-CURING-RTV ADHESIVE SEALANT SUITABLE FOR LOW-RATIO PACKAGING

[75] Inventor: Richard O. Angus, Jr., Halfmoon, N.Y.

[73] Assignee: General Electric Company, Waterford, N.Y.

[21] Appl. No.: 08/805,518

[22] Filed: Feb. 26, 1997

[51] Int. Cl.$^6$ ........................................................ C08L 83/06
[52] U.S. Cl. ............................ 524/863; 524/779; 524/783; 524/785; 524/786; 524/787; 524/788; 524/864; 528/34; 528/901
[58] Field of Search ....................... 528/34, 901; 524/731, 524/863, 783, 785, 786, 788, 787, 779, 864

[56] References Cited

U.S. PATENT DOCUMENTS

| | | |
|---|---|---|
| 2,843,555 | 7/1958 | Berridge . |
| 4,448,928 | 5/1984 | Klein ........................................ 524/863 |
| 4,760,123 | 7/1988 | Imai et al. . |
| 5,246,980 | 9/1993 | Palmer et al. . |
| 5,290,826 | 3/1994 | Palmer . |
| 5,300,611 | 4/1994 | Fujioka et al. . |

FOREIGN PATENT DOCUMENTS

| | | |
|---|---|---|
| 0 369 259 A2 | 5/1990 | European Pat. Off. . |
| 0 369 259 B1 | 5/1990 | European Pat. Off. . |
| 0612335 B1 | 8/1994 | European Pat. Off. . |

*Primary Examiner*—Patricia A. Short
*Attorney, Agent, or Firm*—Kenneth S. Wheelock; Michelle Bugbee

[57] ABSTRACT

The present invention provides for a two component room temperature vulcanizable silicone compositions wherein both components may be used in approximately equal weights or volumes thereby minimizing the effects of mixture ratio errors.

23 Claims, No Drawings

TWO COMPONENT FAST-CURING-RTV ADHESIVE SEALANT SUITABLE FOR LOW-RATIO PACKAGING

FIELD OF THE INVENTION

The present invention relates to room temperature curable silicone compositions that are separately packaged and which cure upon mixing without requiring the presence of atmospheric moisture.

BACKGROUND OF THE INVENTION

The cure rate of conventional single-component room temperature vulcanizable (RTV) formulations are limited by the rate at which atmospheric moisture diffuses into the curing formulation. One practical method by which the cure rate has been increased is to divide the formulation into two components, each of which are separately stable, but which upon mixing in the appropriate ratio, cures rapidly to produce a polymer network having the desired properties. Such two-component formulations are effective because the curing catalyst has been isolated in a first package from the hydroxy-terminated (silanol terminated) polymer which also contains an approximately stoichiometric quantity of water in the second package. When it is desired to prepare a room temperature vulcanizable silicone, mixing of the two components from the first and second packages initiates cure of the RTV silicone. This mode of packaging precludes the use of silanol terminated polymer in the catalyzed component and also limits the proportions in which two-component formulations may be prepared resulting in the need to use small quantities of the catalyst containing component relative to the polymer containing component.

These formulations are thus limited in their utility by the proportion of ingredients comprising each of the components. The first and major component of such two-part RTV formulations generally comprises a linear silanol polymer, both ends terminated by hydroxy (silanol) groups, and fillers. The second and minor component comprises crosslinking agents, adhesion promoters, plasticizing fluids and the cure catalyst. This results in the first component being mixed in a relatively high weight ratio of ten or fifteen to one relative to the weight of the second component.

There are several disadvantages associated with this disparate weight ratio of the two components. In automated continuous mixing equipment, long static mixers are required and there are difficulties associated with uniformly distributing the minor catalyst containing component in the larger polymer containing component. These difficulties are aggravated if the mixing is done by hand to produce small quantities.

Early work by Berridge, U.S. Pat. No. 2,843,555, showed that an RTV formulation comprising a hydroxy terminated silanol polymer, alkoxy-substituted silane crosslinking agents optionally containing mineral fillers remained stable and unchanged in viscosity until the formulation was intentionally cured by the addition of certain metal salts which catalyzed the self-condensation of the hydroxyl groups of the silanol or with the alkoxy groups of the crosslinking agent. More recently a composition has been disclosed that may be used either in one-component or two-component formulations (packaging). Fuijioka et al. in U.S. Pat. No. 5,300,611 disclose extending the minor catalyzed component by the addition of a trimethoxy endcapped silanol polymer. Because water is absent during storage, and because the crosslinker is compounded in the major component there is no reaction. Mixing the two components at a ten to one weight ratio yields a composition that cures as a classical one-component RTV. Because no water is incorporated into the silanol base component the composition does not cure as fast as those compositions where water has been specifically added.

An ultra low modulus two-component silicone sealant as disclosed by Palmer et al., U.S. Pat. No. 5,246,980, comprises a first component containing a hydroxy endblocked polydiorganosiloxane base, non-reinforcing filler, plasticizing fluid, di-functional amido-silane and an aminoxysilane oligomer. The second component comprises a hydroxy endblocked polydiorganosiloxane base, non-reinforcing filler, plasticizing fluid, and a low molecular weight hydroxy endblocked polydiorganosiloxane. The reactive amine functional silanes in the first component not only endcap the silanol polymer but also react with any water present in the formulation as adsorbed water on the filler. While this first component is shelf stable, it will cure by itself if exposed to a moist atmosphere. In contrast, the second component is inherently shelf stable and may be prepared without any particular precaution to exclude atmospheric moisture. Mixing both components together in a one to one weight ratio results in rapid deep section curing that does not require additional atmospherically supplied moisture to cure, producing an ultra low modulus silicone sealant. This particular sealant will cure to a non-flowing gel in three hours or less at 25° C., reaching 35% of its ultimate cured properties in 24 hours. A related invention, U.S. Pat. No. 5,290,826 teaches the addition of water to the second component. However, the addition of water to this formulation apparently does not materially shorten the time required for the RTV to become a non-flowing gel. A significant drawback associated with the use of the di-functional amidosilane in both RTV formulations is that the modulus of the cured formulation is limited. An additional drawback associated with the use of the amidosilane is that endcapping and curing reactions release teratogenic N-alkyl amides of carboxylic acids, e.g. N-methylacetamide.

A tin compound containing composition as one of the components in a two-component system containing the essential ingredients of a triorgano substituted diorganopolysiloxane, the reaction product of a bis-silyl-alkane containing at least two monovalent hydrocarbon radicals per molecule with a diorganotin diacarboxylate and an organosilicon compound containing at least one amino or imino group per molecule is disclosed by Schiller, EP 0,612,335 B1. Additionally, a filler and/or a bis-silyl-alkane containing at least three monovalent hydrocarbon radicals per molecule which are bonded to the silicon via oxygen and are optionally substituted by an alkoxy group or an oligomer thereof.

A two-component fast-curing formulation prepared in various proportions ranging from 20:1 to 1:1 is disclosed by Mueller et al., EP 0,369,259 B1. The preferred ratio of components is 10:1 to 10:6. Component A of Mueller et al. is prepared from the reaction product of a difunctional silanol and a molar excess of an oximosilane crosslinking agent and optionally plasticizing oil, filler, dyes, catalysts, stabilizers, primers and emulsifiers; component B of Mueller et al. contains, as a minimum, hydroxyl substituted silanol polymer and water.

It is thus desirable to be able to provide a general method for the preparation of two-component RTV formulations in which each component is independently shelf stable and can be mixed with each other in a one to one weight or volume basis. It is also desirable to be able to vary the composition of both components in such a fashion that a wide variety of finished RTV products varying from extremely high strength to low modulus and hardness while maintaining a usable viscosity in the uncured components. It would also be desirable to be able to formulate the RTV components such that atmospheric moisture was not necessary to complete a rapid cure reaction, i.e. a cure achieving green strength within fifteen minutes and full cure within twenty-four hours.

SUMMARY OF THE INVENTION

The present invention thus provides for two part room temperature vulcanizable silicone compositions having approximately volumes. The present invention further provides for three different compositions that possess approximately equal volumes. These compositions vary by means of which component contains the cross linking compound. Alternatively both components may contain a cross linking compound which may be the same or different.

The first composition provided for is a two part room temperature vulcanizable silicone composition consisting essentially of a catalyzed component, component (A), and a wet component, component (B); wherein component (A) comprises:

(A)(1) 100 parts by weight of an alkoxy endcapped polydiorganosiloxane of formula 1:

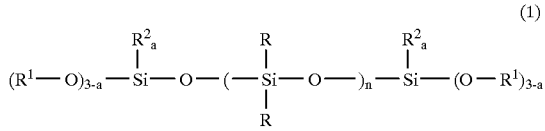

where each R and $R^2$ is independently a substituted or unsubstituted $C_{1-15}$ monovalent hydrocarbon radical, $R^1$ is a $C_{1-8}$ aliphatic organic radical selected from the group consisting of alkyl radicals, alkyl ether radicals, alkylketone radicals, alkylcyano radicals and $C_{7-13}$ aralkyl radicals; n is a whole number ranging from about 50 to 2500 and a is zero or one, having a viscosity ranging from about 100 to 500,000 centipoise at 25° C.;

(A)(2) from 0.25 parts by weight to about 0.75 parts by weight per 100 parts by weight of (A)(1), as described by formula 1, of a condensation curing catalyst; and (C)(1) from slightly greater than zero to about 5 parts by weight per 100 parts of polymer (A)(1), as described by formula 1, of a polyalkoxysilane crosslinking agent of formula 2:

where $R^3$ and $R^4$ are independently substituted or unsubstituted $C_{1-15}$ monovalent hydrocarbon radicals, $R^3$ is a $C_{1-8}$ aliphatic organic radical selected from the group consisting of alkyl radicals, alkyl ether radicals, alkylketone radicals, alkylcyano radicals and $C_{7-13}$ aralkyl radicals and a is zero or one; and wherein component (B) comprises:

(B)(1) 100 parts by weight of a di silanol endstopped polydiorganosiloxane of formula 3:

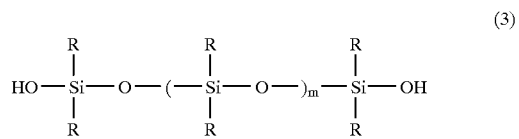

where each R is independently a substituted or unsubstituted $C_{1-15}$ monovalent hydrocarbon radical selected from the group consisting of alkyl radicals, alkyl ether radicals, alkylketone radicals, alkylcyano radicals and $C_{7-13}$ aralkyl radicals; m is a whole number ranging from about 50 to 2500 having a viscosity ranging from about 100 to 500,000 centipoise at 25° C.; wherein the ratio of the volume of component (A) to the volume of component (B) ranges from about 4 volumes of component (A) to about 1 volume of component (B) to about 1 one volume of component (A) to about 4 volumes of component (B).

The second composition provided for is a two part room temperature vulcanizable silicone composition consisting essentially of a catalyzed component, component (A), and a wet component, component (B); wherein component (A) comprises:

(A)(1) 100 parts by weight of an alkoxy endcapped polydiorganosiloxane of formula 1:

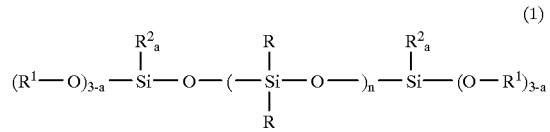

where each R and $R^2$ is independently a substituted or unsubstituted $C_{1-15}$ monovalent hydrocarbon radical, $R^1$ is a $C_{1-8}$ aliphatic organic radical selected from the group consisting of alkyl radicals, alkyl ether radicals, alkylketone radicals, alkylcyano radicals and $C_{7-13}$ aralkyl radicals; n is a whole number ranging from about 50 to 2500 and a is zero or one, having a viscosity ranging from about 100 to 500,000 centipoise at 25° C.;

(A)(2) from 0.25 parts by weight to about 0.75 parts by weight per 100 parts by weight of (A)(1), as described by formula 1, of a condensation curing catalyst; and wherein component (B) comprises:

(B)(1) 100 parts by weight of a di silanol endstopped polydiorganosiloxane of formula 3:

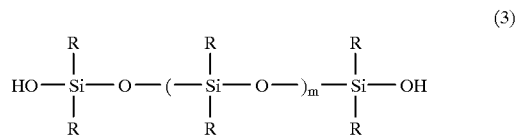

where each R is independently a substituted or unsubstituted $C_{1-15}$ monovalent hydrocarbon radical selected from the group consisting of alkyl radicals, alkyl ether radicals, alkylketone radicals, alkylcyano radicals and $C_{7-13}$ aralkyl radicals; m is a whole number ranging from about 50 to 2500 having a viscosity ranging from about 100 to 500,000 centipoise at 25° C.;

(C)(1) from slightly greater than zero to about 5 parts by weight per 100 parts of polymer (B)(1), as described by formula 3, of a polyalkoxysilane crosslinking agent of formula 2:

$$(R^3O)_{4-a}-Si-R^4_a \quad (2)$$

where $R^3$ and $R^4$ are independently substituted or unsubstituted $C_{1-15}$ monovalent hydrocarbon radicals, $R^3$ is a $C_{1-8}$ aliphatic organic radical selected from the group consisting of alkyl radicals, alkyl ether radicals, alkylketone radicals, alkylcyano radicals and $C_{7-13}$ aralkyl radicals and a is zero or one;

wherein the ratio of the volume of component (A) to the volume of component (B) ranges from about 4 volumes of component (A) to about 1 volume of component (B) to about 1 one volume of component (A) to about 4 volumes of component (B).

The third composition provided for is a two part room temperature vulcanizable silicone composition consisting essentially of a catalyzed component, component (A), and a wet component, component (B); wherein component (A) comprises:

(A)(1) 100 parts by weight of an alkoxy endcapped polydiorganosiloxane of formula 1:

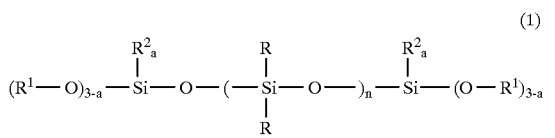

where each R and $R^2$ is independently a substituted or unsubstituted $C_{1-15}$ monovalent hydrocarbon radical, $R^1$ is a $C_{1-8}$ aliphatic organic radical selected from the group consisting of alkyl radicals, alkyl ether radicals, alkylketone radicals, alkylcyano radicals and $C_{7-13}$ aralkyl radicals; n is a whole number ranging from about 50 to 2500 and a is zero or one, having a viscosity ranging from about 100 to 500,000 centipoise at 25° C.;

(A)(2) from 0.25 parts by weight to about 0.75 parts by weight per 100 parts by weight of (A)(1), as described by formula 1, of a condensation curing catalyst; and (A)(6) from slightly greater than zero to about 5 parts by weight per 100 parts of polymer (A)(1), as described by formula 1, of a polyalkoxysilane crosslinking agent of formula 2:

$$(R^3O)_{4-a}-Si-R^4_a \quad (2)$$

where $R^3$ and $R^4$ are independently substituted or unsubstituted $C_{1-15}$ monovalent hydrocarbon radicals, $R^3$ is a $C_{1-8}$ aliphatic organic radical selected from the group consisting of alkyl radicals, alkyl ether radicals, alkylketone radicals, alkylcyano radicals and $C_{7-13}$ aralkyl radicals and a is zero or one;

wherein component (B) comprises:

(B)(1) 100 parts by weight of a di silanol endstopped polydiorganosiloxane of formula 3:

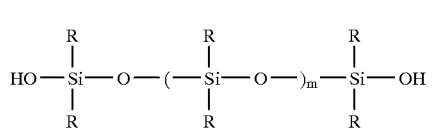

where each R is independently a substituted or unsubstituted $C_{1-15}$ monovalent hydrocarbon radical selected from the group consisting of alkyl radicals, alkyl ether radicals, alkylketone radicals, alkylcyano radicals and $C_{7-13}$ aralkyl radicals; m is a whole number ranging from about 50 to 2500 having a viscosity ranging from about 100 to 500,000 centipoise at 25° C.;

(B)(5) from slightly greater than zero to about 5 parts by weight per 100 parts of polymer (B)(1), as described by formula 3, of a polyalkoxysilane crosslinking agent of formula 2:

$$(R^3O)_{4-a}-Si-R^4_a \quad (2)$$

where $R^3$ and $R^4$ are independently substituted or unsubstituted $C_{1-15}$ monovalent hydrocarbon radicals, $R^3$ is a $C_{1-8}$ aliphatic organic radical selected from the group consisting of alkyl radicals, alkyl ether radicals, alkylketone radicals, alkylcyano radicals and $C_{7-13}$ aralkyl radicals and a is zero or one;

wherein the ratio of the volume of component (A) to the volume of component (B) ranges from about 4 volumes of component (A) to about 1 volume of component (B) to about 1 one volume of component (A) to about 4 volumes of component (B).

DETAILED DESCRIPTION OF THE INVENTION

This invention relates to compositions of two-component formulations of silicone rubber, mixed in low ratio of components from which, the resulting mixture is capable of rapid cure and excellent adhesion to a wide variety of substrates. More specifically, the invention relates to formulations in which the components can be mixed in an approximately 1:1 volume ratio thereby minimizing the effects of mixture-ratio errors on the properties of the final formulation and easing application from hand held cartridges and allowing applicators an easy visual method of monitoring the mix ratio by monitoring the relative amounts of movement of the follower plates used to pump the sealant components.

As a result, the mixing ratio in accordance with the present invention provides major improvements in productivity when both components are pumped from drums of equal size using equivalent equipment in that it is particularly convenient to be able to visually monitor progress of the follower plates of each pair of dispensing pumps to verify delivery of the desired 1:1 ratio. Such a mixing ratio also provides major improvements in the consistency of the final mixture of the two-components by minimizing the effect of mixture ratio on the properties of the final formulation allowing substantial malfunction of dispensing equipment before the integrity of the cured sealant will suffer.

I now disclose a method of packaging conventional catalysts in a stable formulation containing hetero-organoendcapped silanol polymer which allows much greater flexibility in the ratio of wet to catalyzed components than in the conventional two-component technologies. This invention also allows for the ratio of wet component to catalyzed component to be much closer to one to one. The 1:1 ratio is highly desirable in the marketplace and is thus a primary feature of this disclosure.

The two-component package of the present invention is comprised of a wet component and a catalyzed component which are each unto themselves a shelf-stable formulation. These two components, when mixed in an approximately 1:1 volumetric ratio, provide the correct blend of polymer (s), crosslinkers, filler(s), additive(s) and appropriate catalyst(s) to form a well cured polydimethylsiloxane crosslinked, filled network with good mechanical properties useful in most applications in which conventional one-component RTV cured formulations are known to be applicable. The wet component of the present invention is comprised of:
polydimethyldisilanol(s);
reinforcing and/or non-reinforcing filler(s);
PDMS or organic plasticising fluids;
alkoxy silane crosslinking reagents;
sufficient water to allow rapid and complete cure of the siloxane network; and
specialty additives specific to the performance of the final formulation.

The catalyzed component of the present invention is comprised of:
hetero-organo-endcapped silanol polymer(s);
reinforcing and/or non-reinforcing filler(s);
PDMS or organic plasticising fluids;
alkoxy silane crosslinking reagents;
any of the conventional one-component RTV catalyst known to promote condensation of silanol and/or hetero-organo-endcapped silanol polymers; and
specialty additives specific to the performance of the final formulation.

A two-component RTV formulated such that each component is a shelf-stable package unto itself, each containing a portion, in a small ratio of about 4 to 1:1, preferably 2 to 1:1 and most preferably 1:1, of the ingredients required to prepare the final desired formulation. The final formulation contains sufficient ingredients to allow full curing of the formulation in the absence of atmospheric moisture and sufficient catalyst such that said cure rate may be designed into each two-component package so as to meet the requirements of many applications requiring from extremely rapid to quite slow cure rates. An alternate form of the invention can be one in which the water level incorporated into the wet component is insufficient to provide full cure but substantial to allow rapid skin-over followed by completion of the cure by conventional one-component cure technology.

Due to the wide range of polymer molecular weight, type and level of fillers and crosslinking agents as well as specialty additives, this invention can be utilized to prepare a wide variety of formulations that cure to afford a wide range of properties in the resultant cured rubber. Specifically, such 2-component, RTV sealants are obtained by preparing two distinct and separate components: catalyzed and wet. The catalyzed component, component (A) is obtained by mixing, usually in a high shear continuous or batch process the following sub-components.

(A)(1) 100 parts by weight of an alkoxy endcapped polydiorganosiloxane of formula 1:

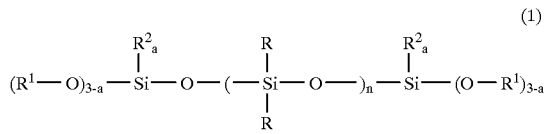
(1)

where each R and $R^2$ is independently a substituted or unsubstituted $C_{1-15}$ monovalent hydrocarbon radical, $R^1$ is a $C_{1-8}$ aliphatic organic radical selected from alkyl radicals, alkyl ether radicals, alkylketone radicals, alkylcyano radicals or a $C_{7-13}$ aralkyl radical; n is a whole number ranging from about 50 to 2500 and a is zero or one. The viscosity range of the polymer of formula 1 is from about 100 to 500,000 centipoise (cps.), preferably from about 500 to about 300,000 cps. and most preferably is from about 10,000 to 150,000 cps. measured at 25° C. The terminal silicon atom of the polymer must have at least two alkoxy groups and can have as many as three alkoxy groups in accordance with formula 1.

(A)(2) From 0.25 parts by weight to about 0.75 parts by weight, preferably from about 0.3 to 0.6 parts by weight and most preferably from abut 0.35 to 0.45 parts by weight, per 100 parts of polymer described by formula 1, sub-component (A)(1), of a condensation curing catalyst. Suitable catalysts include, but are not limited to, dibutylstannicdiacetate, dibutylstannicdilaurate, dibutylstannisacetatelaurate, stannous 2-ethylhexanoate, dimethylstannicdineodecanoate, tetra-n-butyltitanate, tetra-iso-propyltitanate, 2,5-di-isopropoxy-bis(ethylacetoacetate) titanium, 1,3-di-hydroxypropane-(acetoacetate) (ethylacetoacetate)titanium and partially chelated derivatives of these salts with chelating agents such as acetoacetic acid esters and β-diketones. Any catalyst known in the art that is useful in facilitating the self-coupling reaction of silanols or hetero-organo-endcapped silanols or of the coupling between silanols and hetero-organo-endcapped silanols is a such a condensation curing catalyst.

(A)(3) From about 10 to 40 parts by weight, preferably from about 12 to about 18 parts by weight and most preferably from about 14 to about 20 parts by weight of a treated reinforcing fumed silica filler per 100 parts of polymer described by formula 1, sub-component (A)(1).

(A)(4) From about zero to 100 parts by weight, preferably from 10 to 80 parts by weight and most preferably from 15 to 25 parts by weight, per 100 parts of a polymer described by formula 1, sub-component (A)(1), of a non-reinforcing filler selected from but not limited to a list of inorganic mineral compounds such as of alkali metal carbonates and sulfates, alkaline earth metal carbonates and sulfates, $TiO_2$, $Fe_2O_3$, ZnO, MgO, $Al_2O_3$, $Al(SO_4)_3$, $SiO_2$, diatomaceous earth, and organic and siloxane resins. The filler may optionally be treated with a treating agent selected from a group consisting, but not limited to, calcium stearate, stearic acid and other salts of fatty acids. Type and degree of treatment allows modification of the modulus of the cured formulation and the flow characteristics of the uncured formulation.

(A)(5) From about zero to about 35 parts by weight, preferably about 10 to 25 and most preferably from 15 to 20 parts by weight per 100 parts of polymer described by formula 1, sub-component (A)(1) of a triorgano-endstopped diorganopolysiloxane having a viscosity of from 10 to 5,000 cps., measured at 25° C. where the organic substituents are monovalent hydrocarbon radicals, preferably containing from 1 to 8 carbon atoms. Such linear diorganosiloxane polymers are useful as plasticizers. Preferably, such plasticizers are free of silanol groups but may contain up to 500 parts per million, ppm, of silanol groups. It is also preferable that the organic substituent groups are methyl and the viscosity ranges from 15 to 1,000 cps. and most preferably from about 20 to 200 cps., measured at 25° C.

(A)(6) or (C)(1) From zero to about 5 parts by weight, preferably from about zero to 3.5 parts by weight and most preferably from about 1 to 2.5 parts by weight per 100 parts of polymer described by formula 1, sub-component (A)(1) of a polyalkoxysilane crosslinking agent of formula 2:

(2)

where $R^3$ and $R^4$ are independently substituted or unsubstituted $C_{1-15}$ monovalent hydrocarbon radicals, $R^3$ is a $C_{1-8}$ aliphatic organic radical selected from alkyl radicals, alkyl ether radicals, alkylketone radicals, alkylcyano radicals or a $C_{7-13}$ aralkyl radical and a is zero or one. The preferred compounds within the scope of this invention include but are not limited to: vinyltrimethoxysilane, methyltrimethoxy silane, ethyltrimethoxy silane, tetramethoxysilane, tetraethoxy silane, tetra n-propoxy silane, tetra $i$-propoxy silane, tetra n-butoxy silane, tetra i-butoxy silane and their partially hydrolyzed and subsequently condensed derivatives. The silane of formula 2 may be added for several purposes including but not limited to: providing stability to the compositions, to cap any unreacted silanol groups on the silicone fluid and to act as an aid to adhesion.

The wet component, component (B) is obtained by mixing:

(B)(1) 100 parts by weight (parts by weight) of a di silanol endstopped polydiorganosiloxane of formula 3:

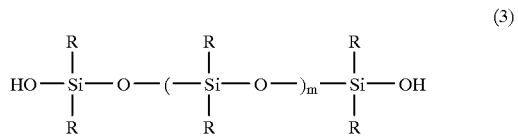

(3)

where each R is independently a substituted or unsubstituted $C_{1-15}$ monovalent hydrocarbon radical selected from but not limited to alkyl radicals, alkyl ether radicals, alkylketone radicals, alkylcyano radicals or a $C_{7-13}$ aralkyl radical; m is a whole number ranging from about 50 to 2500. The viscosity range of the polymer of Formula 1 is from about 100 to 500,000 cps., preferably from about 500 to about 300,000 cps. and most preferably is from about 10,000 to 150,000 cps. measured at 25° C.

(B)(2) From about 0.02 to about 0.1 parts by weight, preferably from about 0.03 to 0.08 parts by weight and most preferably from 0.04 to 0.06 parts by weight, per 100 parts of polymer described by formula 3, sub-component (B)(1), of water.

(B)(3) From about zero to 40 parts by weight, preferably from about 10 to about 20 parts by weight and most preferably from about 12 to about 16 parts by weight of a treated reinforcing fumed silica filler per 100 parts of polymer described by formula 3, sub-component (B)(1);

(B)(4) From about zero to 100 parts by weight, preferably from 10 to 80 parts by weight and most preferably from 15 to 25 parts by weight, per 100 parts of polymer described by formula 3, sub-component (B)(1), of a non-reinforcing filler selected from but not limited to a list of inorganic mineral compounds such as carbonates and sulfates of alkali and alkali earth metals, and oxides of transition metals such as $CaCO_3$, $TiO_2$, $Fe_2O_3$, ZnO, MgO, $Al_2O_3$ (possibly hydrated, $Al(SO_4)_3$), quartz and organic or siloxane resins, diatomacious earth, etc. The filler may optionally be treated with a treating agent selected from a group consisting, but not limited to, calcium stearate, stearic acid and other salts of fatty acids. Type and degree of treatment allows modification of the modulus of the cured formulation and the flow characteristics of the uncured formulation.

(B)(5) or (C)(1) From zero to about 5 parts by weight, preferably from about 1 parts by weight to 3.5 parts by weight and most preferably from abut 1.5 to 2.5 parts by weight, per 100 parts of polymer described by formula 3, sub-component (B)(1), of a polyalkoxysilane crosslinking agent of formula 2:

(2)

where $R^1$, $R^2$ and a are as previously defined. The preferred compounds within the scope of this invention include but are not limited to: vinyltrimethoxysilane, methyltrimethoxy silane, ethyltrimethoxy silane, tetramethoxysilane, tetraethoxy silane, tetra n-propoxy silane, tetra i-propoxy silane, tetra n-butoxy silane, tetra i-butoxy silane and their partially hydrolyzed and subsequently condensed derivatives.

It is to be noted that the cross linking compounds, component (A)(6) and (B)(5) have been alternatively designated (C)(1). One of either component (A) or (B) must contain a crosslinking compound. Alternatively both components may contain a cross linking compound which may be the same or different.

Conventional additives such as pigments, heat stability additives, adhesion promoters etc. may be present in either or both components so long as they do not interfere with the cure chemistry.

The unique and unexpected result conferred by these particular formulations is that by choosing these specific classes of polymers, the volumes of the two components are approximately equal. By approximately equal, Applicant defines the volumetric ratio of the two components to be from about 4 parts by volume of component (A) to about 1 part by volume of component (B) or alternatively from about 4 parts by volume of component (B) to about 1 part by volume of component (A), preferably be from about 3 parts by volume of component (A) to about 1 part by volume of component (B) or alternatively 3 parts by volume of component (B) to about 1 part by volume of component (A), more preferably be from about 2 parts by volume of component (A) to about 1 part by volume of component (B) or alternatively 2 parts by volume of component (B) to about 1 part by volume of component (A), and most preferably be from about 1 part by volume of component (A) to about 1 part by volume of component (B) or alternatively 1 part by volume of component (B) to about 1 part by volume of component (A). Because the use of these specific polymers enables the use of two component room temperature vulcanizable silicone compositions in volume ratios of the two components that are below ten to one, it is the sense of Applicant's invention that two component room temperature vulcanizable compositions that utilize these compositions in volume ratios less than ten to one are essentially equivalent to Applicant's invention. It is to be noted that while each component is present in an approximately equal volumetric amount, the amounts of additional sub-components in each component are based on 100 parts by weight of polymer (A)(1) in component (A) and 100 parts by weight of polymer (B)(1) in component (B). Thus when additional sub-components are recited in the appended claims, the weight of the sub-component is added to that of the respective base polymer, (A)(1) for component (A) or (B)(1) for component (B).

Many substrates can be bonded with other substrates using the silicone rubber of the present invention. Such substrates are exemplified by inorganic substrates such as glass, ceramic, porcelain, cement, mortar, concrete, natural stone, etc.; by metal substrates such as copper, aluminum, iron, steel, stainless steels, etc.; by organic polymer resins such as polyarylate, polyamide, polyimide, polycarbonate, polyacrylate, polymethacrylate, polystyrene, polyester, polybutylene, phenolic, epoxy, polybutylene terephthalate, polyphenylene oxide, by blends of the aforementioned resins such as polyphenylenesulfide, acrylonitrile/butadiene/styrene copolymer, etc.; by rubbers such as natural rubber, synthetic rubber, silicone rubber, etc.

EXPERIMENTAL

So that those skilled in the art can understand the present invention, the following examples are presented, it being understood that these examples are illustrative only and should not limit the scope of the invention in the appended claims. The composition of formulations shown in examples are measured in parts by weight, measured at 23±3° C. unless otherwise specified. Components were mixed in either: a stirred-tank reactor; a dough mixer; a Semco™ mixing, storage and dispensing tube with a Semkit mixing system, dual dispensing tubes forcing a fixed ratio of components into the head of a static mixing tube or on a 30 mm Werner-Pfleiderer counter-rotating twin-screw extruder.

Reference Example 1

Preparation of a Wet Base in a Stirred-tank Reactor 40 parts by weight of calcium carbonate was added to a stirred-tank reactor; to this was added with agitation, 100 parts by weight of silanol, 3,000 cps., 3 parts by weight of partially hydrolyzed and subsequently condensed tetraethoxysilane, (dp about 5) and 0.07 parts by weight of water.

Reference Example 2

Preparation of a Wet Base in a Dough Mixer 41.4 parts by weight treated fumed silica was blended with 100 parts by weight of silanol, 30,000 cps., 42.9 parts by weight of mono-t-butoxy-endcapped silanol, 3,000 cps., 2.6 parts by weight of low molecular weight silanol with a dp of ca. 5, 0.77 parts by weight of titanium dioxide and 38.5 parts by weight of fully trimethylsiloxy-endcapped silanol, 20 cps.

Reference Example 3

Preparation of a Wet Base in a Semkit™ Mixer

Equal portions of the formulations described in Reference Example 1 and Reference Example 2 were mixed in a Semkit™ mixer for 15 minutes.

Reference Example 4

Preparation of a Wet Base in a Semkit™ Mixer 420 g of the formulations described in Reference Example 1, 202 g of the formulations described in Reference Example 2 and 6.6 g of aminoethylaminopropyltrimethoxysilane were mixed in a Semkit™ mixer for 15 minutes. Within 1 hour, viscosity in the formulation began to build substantially.

Reference Example 5

Preparation of a Wet Base in a Semkit™ Mixer 405 g of the formulations described in Reference Example 1 and 212 g of the formulations described in Reference Example 2 were mixed in a Semkit™ mixer for 15 minutes.

Reference Example 6

Preparation of a Dry Base in the Werner-Pfleiderer Extruder 60 parts by weight of silanol, 30,000 cps. and 40 parts by weight of silanol, 3,000 cps., were mixed with 13.64 parts by weight of $D_4$ treated fumed silica in a Werner-Pfleiderer extruder beginning at 75° C. and cooled to 25° C. at the outlet.

Reference Example 7

Preparation of a Wet Base in a Semkit™ Mixer 405 g of the formulations described in Reference Example 1 and 212 g of the formulations described in Reference Example 6 were mixed in a Semkit™ mixer for 15 minutes.

Reference Example 8

Preparation of a Catalyzed Component in the Werner-Pfleiderer Extruder

In the Werner-Pfleiderer extruder, 17 parts by weight of $D_4$ treated fumed silica was sheared into 100 parts by weight of methyldimethoxy-terminated silanol polymer, 100,000 cps, and this paste was diluted with 20 parts by weight trimethylsilyl-endcapped silanol polymer composed solely of D units and 6.4 parts by weight of trimethylsilyl-endcapped silanol polymer composed of mostly D units with a small incorporation of T units; 2.3 parts by weight of hexamethyldisilazane, 1.6 parts by weight aminoethylaminopropyltrimethoxysilane, 0.45 parts by weight methyltrimethoxysilane, 0.4 parts by weight dibutylstannicdiacetate, and 4.5 parts by weight of a blue pigment blend in trimethylsilyl-endcapped silanol polymer composed solely of D units with a viscosity of about 10,000 cps.

Reference Example 9

Preparation of a Catalyzed Component in the Werner-Pfleiderer Extruder

In the Werner-Pfleiderer extruder, 18.5 parts by weight of $D_4$ treated fumed silica was sheared into 100 parts by weight of methyldimethoxy-terminated silanol polymer, 100,000 cps, and this paste was diluted with 20 parts by weight trimethylsilyl-endcapped silanol polymer composed solely of D units and 10.8 parts by weight of trimethylsilyl-endcapped silanol polymer composed of mostly D units with a small incorporation of T units; 2.3 parts by weight of hexamethyldisilazane, 1.5 parts by weight aminoethylaminopropyltrimethoxysilane, 0.46 parts by weight methyltrimethoxysilane and 0.4 parts by weight dibutylstannicdiacetate.

Reference Example 10

Preparation of a Catalyzed Component in the Werner-Pfleiderer Extruder

In the Werner-Pfleiderer extruder, 18.5 parts by weight of $D_4$ treated fumed silica was sheared into 100 parts by weight of methyldimethoxy-terminated silanol polymer, 100,000 cps, and this paste was diluted with 20 parts by weight trimethylsilyl-endcapped silanol polymer composed solely of D units and 10.8 parts by weight of trimethylsilyl-endcapped silanol polymer composed of mostly D units with a small incorporation of T units; 2.3 parts by weight of hexamethyldisilazane, 1.5 parts by weight aminoethylaminopropyltrimethoxysilane, 0.46 parts by weight methyltrimethoxysilane and 0.4 parts by weight dibutylstannicdiacetate.

Reference Example 11

Preparation of a Catalyzed Component in the Werner-Pfleiderer Extruder

In the Werner Pfleiderer extruder, 17 parts by weight of $D_4$ treated fumed silica was sheared into 100 parts by weight of methyldimethoxy-terminated silanol polymer, 100,000 cps, and this paste was diluted with 20 parts by weight trimethylsilyl-endcapped silanol polymer composed solely of D units and 6.4 parts by weight of trimethylsilyl-endcapped silanol polymer composed of mostly D units with a small incorporation of T units; 2.3 parts by weight of hexamethyldisilazane, 1.6 parts by weight aminoethylaminopropyltrimethoxysilane, 0.45 parts by weight methyltrimethoxysilane and 0.4 parts by weight dibutylstannicdiacetate.

Reference Example 12

Preparation of a Catalyzed Component in the Werner-Pfleiderer Extruder

In the Werner-Pfleiderer extruder, 17.1 parts by weight of $D_4$ treated fumed silica was sheared into 100 parts by weight of methyldimethoxy-terminated silanol polymer, 30,000 cps, and this paste was diluted with 14.3 parts by weight trimethylsilyl-endcapped silanol polymer composed solely of D units and 5 parts by weight of trimethylsilyl-endcapped silanol polymer composed of mostly D units with a small incorporation of T units; 2.9 parts by weight of hexamethyldisilazane, 1.45 parts by weight aminoethylaminopropyltrimethoxysilane, 0.7 parts by weight methyltrimethoxysilane and 0.3 parts by weight dibutylstannicdiacetate.

Reference Example 13

Preparation of a Catalyzed Component in the Werner-Pfleiderer Extruder

In the Werner-Pfleiderer extruder, 18.5 parts by weight of $D_4$ treated fumed silica was sheared into 100 parts by weight of methyldimethoxy-terminated silanol polymer, 30,000 cps, and this paste was diluted with 7.7 parts by weight trimethylsilyl-endcapped silanol polymer composed solely of D units and 10.8 parts by weight of trimethylsilyl-endcapped silanol polymer composed of mostly D units with a small incorporation of T units and 2.3 parts by weight of hexamethyldisilazane.

Reference Example 14

Preparation of a Catalyzed Component in the Werner-Pfleiderer Extruder

In the Werner-Pfleiderer extruder, 18.5 parts by weight of $D_4$ treated fumed silica was sheared into 100 parts by weight of methyldimethoxy-terminated silanol polymer, 30,000 cps, and this paste was diluted with 22.3 parts by weight trimethylsilyl-endcapped silanol polymer composed solely of D units and 5.4 parts by weight of trimethylsilyl-endcapped silanol polymer composed of mostly D units with a small incorporation of T units.

Reference Example 15

Preparation of a Wet Base in a Semkit™ Mixer 405 g of the formulations described in Reference Example 1, 211 g of the formulations described in Reference Example 2 were mixed in a Semkit™ mixer for 5 minutes.

Reference Example 16

Preparation of a Catalyzed Component in a Semkit™ Mixer 575 g of the formulations described in Reference Example 12 and 0.6 g of dibutylstannicdiacetate were mixed in a Semkit™ mixer for 10 minutes.

Example 1

Preparation in Semco™ Tubes of a Catalyzed Formulation

In a Semco™ tube, 75 g of the formulation described in Reference Example 3 was mixed with 75 g of the formulation described in Reference Example 8 during about one minute; the formulation was cast into a 4" by 5" Teflon™ mold about 0.075" deep and allowed to cure at 23±2.5° C. and 50±5% relative humidity for six days. Cure was evident soon after casting the formulation as the formulation was tack-free within 5 minutes. Physical testing data for this formulation is shown in Table B.

Example 2

Preparation in Semco™ Tubes of a Catalyzed Formulation

In a Semco™ tube, 75 g of the formulation described in Reference Example 6 was mixed with 75 g of the formulation described in Reference Example 8 during about one minute; the formulation was cast into a 4" by 5" Teflon™ mold about 0.075" deep and allowed to cure at 23±2.5° C. and 50±5% relative humidity for six days. Four hours after casting the formulation was still tacky; after 24 hours, the sheet felt cured. Physical testing data for this formulation is shown in Table B.

Example 3

Preparation in Semco™ Tubes of a Catalyzed Formulation

In a Semco™ tube, the formulation of Example 1 was duplicated. Shear analysis specimens from production line window segments were assembled during the next four minutes. Cure was evident soon after assembly of the first four specimens. Shear analysis data is presented as a function of time after mixing ingredients in Table A.

Example 4

Preparation in Semco™ Tubes of a Catalyzed Formulation

In a Semco™ tube, 40 g of the formulation described in Reference Example 5 was mixed, during about one minute, with 40 g of the formulation described in Reference Example 11, to which the level of aminoethylaminopropyltrimethoxysilane had been doubled. Shear analysis specimens from production line window segments were assembled during the next four minutes. Cure was evident soon after assembly of the first four specimens. Shear analysis data is presented as a function of time after mixing ingredients in Table A.

TABLE A

| Example No. | Specimen | Elapsed Time (min/hour) | Shear Strength (psi) |
|---|---|---|---|
| Ex 3 | A | 15 min | 2.9 |
|  | B | 30 min | 3.4 |
|  | C | 60 min | 4.5 |
|  | D | 120 min | 5.6 |
| Ex 4 | A | 15 min | 3.0 |
|  | B | 30 min | 5.6 |
|  | C | 60 min | 11.8 |
|  | D | 2 hours | 16.4 |
|  | E | 18 hours | 47.3 |
|  | F | 24 hours | 42.1 |
|  | G | 24 hours | 48.7 |

Example 5

Preparation in Semco™ Tubes of a Catalyzed Formulation

In a Semco™ tube, 101 g of the formulation described in Reference Example 5 was mixed with 68 g of the formulation described in Reference Example 11 during about three minutes; the formulation was cast into a 4" by 5 5" Teflon™ mold about 0.075" deep and allowed to cure at 23±2.5° C. and 50±5% relative humidity for six days. The surface of the sheets was slightly wavy—characteristic or a two-component formulation which was tooled after cross-linking had progressed significantly. Physical testing data for this formulation is shown in Table B.

Comparative Example 5

Preparation in a Static Mixer of a Catalyzed Formulation

In a dual tube system, dispensing equal portions through a static mixing tube, of the formulations described in Reference Example 5 and Reference Example 8; the formulation was cast into a 4" by 5" Teflon™ mold about 0.075" deep and allowed to cure at 23±2.5° C. and 50±5% relative humidity. Cure was evident soon after casting the formulation as the formulation was tack-free within 5 minutes. Physical testing data for this formulation is shown in Table B.

Example 6

Preparation in Semco™ Tubes of a Catalyzed Formulation

In a Semco™ tube, 75 g of the formulation described in Reference Example 7 was mixed with 75 g of the formulation described in Reference Example 11 during about one to two minutes; the formulation was cast into a 4" by 5" Teflon™ mold about 0.075" deep and allowed to cure at 23±2.5° C. and 50±5% relative humidity for 19 hours. The surface of the sheets was slightly wavy as in Example 5. Physical testing data for this formulation is shown in Table B.

Comparative Example 6

Preparation in Semco™ Tubes of a Catalyzed Formulation

Cured RTV sheets formed from the formulation described in Example 6 were allowed to cure at 23±2.5° C. and 50±5% relative humidity for seven days. Physical testing data for these sheets is shown in Table B.

Example 7

Preparation in Semco™ Tubes of a Catalyzed Formulation

In a Semco™ tube, 75 g of the formulation described in Reference Example 2 was mixed with 75 g of the formulation described in Reference Example 11 during about one to two minutes; the formulation was cast into a 4" by 5" Teflon™ mold about 0.075" deep and allowed to cure at 23±2.5° C. and 50±5% relative humidity for 13 days. After 24 hours, the sheet had not cured completely; sheets were removed from the mold after three days. Physical testing data for this formulation is shown in Table B.

Example 8

Preparation in Semco™ Tubes of a Catalyzed Formulation

In a Semco™ tube, 75 g of the formulation described in Reference Example 7 was mixed with 75 g of the formulation described in Reference Example 10 during about one to two minutes; the formulation was cast into a 4" by 5" Teflon™ mold about 0.075" deep and allowed to cure at 23±2.5° C. and 50±5% relative humidity for seven days. After 24 hours, the sheet had not cured completely; sheets were removed from the mold after three days. Physical testing data for this formulation is shown in Table B.

TABLE B

| Example No. | Hardness, Shore A durometer | Ultimate Tensile Strength (psi) | Ultimate Elongation (%) | s @ 100% e |
|---|---|---|---|---|
| Ex 1 | 23 | 318 | 346 | 92 |
| Ex 2 | 16.9 | 234 | 325 | 78 |
| Ex 5 | 23.5 | 255 | 254 | 94 |
| Comp | 23.8 | 231 | 212 | 106 |
| Ex 6 | 24.6 | 234 | 221 | 92 |
| Comp | 24.6 | 275 | 248 | 96 |
| Ex 7 | 18.5 | 387 | 485 | 73 |
| Ex 8 | 13.1 | 118.5 | 134 | 83 |

Example 9

Preparation in a Static Mixer of a Catalyzed Formulation

Using a dual tube dispensing system, equal portions of the formulations described in Reference Example 15 and Reference Example 12 were dispensed into a static mixer; the resulting formulation was cast into a 4" by 5" Teflon™ mold about 0.075" deep and allowed to cure at 23±2.5° C. and 50±5% relative humidity. Cure was evident soon after casting the formulation as the formulation was tack-free within 10 minutes.

Example 10

Preparation in a Static Mixer of a Catalyzed Formulation

Using a dual tube dispensing system, equal portions of the formulations described in Reference Example 15 and Reference Example 16 were dispensed into a static mixer; the resulting formulation was cast into a 4" by 5" Teflon™ mold about 0.075" deep and allowed to cure at 23±2.5° C. and 50±5% relative humidity. Cure was evident soon after casting the formulation as the formulation was tack-free within 5 minutes.

Example 11

Preparation in Semco™ Tubes of a Catalyzed Formulation

In a Semco™ tube, 133 g of the formulation described in Reference Example 13, 9.0 g of trimethylsiloxy endcapped dimethylpolysiloxane, essentially free of silanol endgroups, 2.5 g of partially hydrolyzed and subsequently condensed tetraethoxy silane and 1.2 g dibutylstannicdiacetate was mixed with 60 g of the formulation described in Reference Example 1 during about one to two minutes; the formulation was cast into a 4" by 5" Teflon™ mold about 0.075" deep. Cure was rapid. The sheet was removed from the mold after 24 hours and allowed to cure at 23±2.5° C. and 50±5% relative humidity for seven days. Physical data for the sheet is reported in Table C.

Comparative Example 11

Preparation in Semco™ Tubes of a Catalyzed Formulation

In a Semco™ tube, 102 g of the formulation described in Reference Example 13, 9.0 g of trimethylsiloxy endcapped dimethylpolysiloxane, essentially free of silanol endgroups, 2.1 g of partially hydrolyzed and subsequently condensed tetraethoxy silane and 1.2 g dibutylstannicdilaurate was mixed with 90 g of the formulation described in Reference Example 1 during about one to two minutes; the formulation was cast into a 4" by 5" Teflon™ mold about 0.075" deep. Cure was rapid. The sheet was removed from the mold after 24 hours and allowed to cure at 23±2.5° C. and 50±5% relative humidity for seven days. Physical data for the sheet is reported in Table C.

Comparative Example 11a

Preparation in Semco™ Tubes of a Catalyzed Formulation

In a Semco™ tube, 133 g of the formulation described in Reference Example 13, 9.0 g of trimethylsiloxy endcapped dimethylpolysiloxane, essentially free of silanol endgroups, 2.5 g of partially hydrolyzed and subsequently condensed tetraethoxy silane and 1.2 g dibutylstannicdilaurate was mixed with 60 g of the formulation described in Reference Example 1 during about one to two minutes; the formulation was cast into a 4" by 5" Teflon™ mold about 0.075" deep. Cure was rapid. The sheet was removed from the mold after 24 hours and allowed to cure at 23±2.5° C. and 50±5% relative humidity for seven days. Physical data for the sheet is reported in Table C.

Example 12

Preparation in Semco™ Tubes of a Catalyzed Formulation

In a Semco™ tube, 120 g of the formulation described in Reference Example 13, 9.0 g of trimethylsiloxy endcapped dimethylpolysiloxane, essentially free of silanol endgroups, 3.8 g tetraethoxy silane and 0.4 g dibutylstannicdiacetate was mixed with 60 g of the formulation described in Reference Example 1 during about one to two minutes; the formulation was cast into a 4" by 5" Teflon™ mold about 0.075" deep. Cure was rapid. The sheet was removed from the mold after 24 hours and allowed to cure at 23±2.5° C. and 50±5% relative humidity for seven days. Physical data for the sheet is reported in Table C.

Example 13

Preparation in Semco™ Tubes of a Catalyzed Formulation

In a Semco™ tube, 124 g of the formulation described in Reference Example 14, 3.7 g of partially hydrolyzed and subsequently condensed tetraethoxy silane and 0.4 g dibutylstannicdiacetate was mixed with 60 g of the formulation described in Reference Example 1 during about one to two minutes; the formulation was cast into a 4" by 5" Teflon™ mold about 0.075" deep. Cure was rapid. The sheet was removed from the mold after 24 hours and allowed to cure at 23±2.5° C. and 50±5% relative humidity for seven days. Physical data for the sheet is reported in Table C.

Comparative Example 13

Preparation in Semco™ Tubes of a Catalyzed Formulation

In a Semco™ tube, 124 g of the formulation described in Reference Example 14, 3.7 g of tetraethoxy silane and 0.4 g dibutylstannicdiacetate was mixed with 60 g of the formulation described in Reference Example 1 during about one to two minutes; the formulation was cast into a 4" by 5" Teflon™ mold about 0.075" deep. Cure was rapid. The sheet was removed from the mold after 24 hours and allowed to cure at 23±2.5° C. and 50±5% relative humidity for seven days. Physical data for the sheet is reported in Table C.

Example 14

Preparation in Semco™ Tubes of a Catalyzed Formulation

In a Semco™ tube, 94 g of the formulation described in Reference Example 14, 3.7 g of partially hydrolyzed and subsequently condensed tetraethoxy silane and 0.4 g dibutylstannicdiacetate was mixed with 90 g of the formulation described in Reference Example 1 during about one to two minutes; the formulation was cast into a 4" by 5" Teflon™ mold about 0.075" deep. Cure was rapid. The sheet was removed from the mold after 24 hours and allowed to cure at 23±2.5° C. and 50±5% relative humidity for seven days. Physical data for the sheet is reported in Table C.

Comparative Example 14

Preparation in Semco™ Tubes of a Catalyzed Formulation

In a Semco™ tube, 94 g of the formulation described in Reference Example 14, 3.7 g of tetraethoxy silane and 0.4 g dibutylstannicdiacetate was mixed with 90 g of the formulation described in Reference Example 1 during about one to two minutes; the formulation was cast into a 4" by 5" Teflon™ mold about 0.075" deep. Cure was rapid. The sheet was removed from the mold after 24 hours and allowed to cure at 23±2.5° C. and 50±5% relative humidity for seven days. Physical data for the sheet is reported in Table C.

Example 15

Preparation in Semco™ Tubes of a Catalyzed Formulation

In a Semco™ tube, 64 g of the formulation described in Reference Example 14, 3.7 g of partially hydrolyzed and subsequently condensed tetraethoxy silane and 0.4 g dibutylstannicdiacetate was mixed with 120 g of the formulation described in Reference Example 1 during about one to two minutes; the formulation was cast into a 4" by 5" Teflon™ mold about 0.075" deep. Cure was rapid. The sheet was removed from the mold after 24 hours and allowed to cure at 23±2.5° C. and 50±5% relative humidity for seven days. Physical data for the sheet is reported in Table C.

Comparative Example 15

Preparation in Semco™ Tubes of a Catalyzed Formulation

In a Semco™ tube, 64 g of the formulation described in Reference Example 14, 3.7 g of tetraethoxy silane and 0.4 g dibutylstannicdiacetate was mixed with 120 g of the formulation described in Reference Example 1 during about one to two minutes; the formulation was cast into a 4" by 5" Teflon™ mold about 0.075" deep. Cure was rapid. The sheet was removed from the mold after 24 hours and allowed to cure at 23±2.5° C. and 50±5% relative humidity for seven days. Physical data for the sheet is reported in Table C.

TABLE C

| Example No. | Hardness, Shore A durometer | Ultimate Tensile Strength (psi) | Ultimate Elongation (%) | s @ 100% e |
|---|---|---|---|---|
| Ex 11 | 31.6 | 388 | 204 | 104 |
| Comp | 26.5 | 189 | 134 | 128 |
| Comp | 24.9 | 383 | 258 | 118 |
| Ex 12 | 35.2 | 237 | 149 | 135 |
| Ex 13 | 22.5 | 140 | 125 | 104 |
| Comp | 21.6 | 228 | 196 | 92 |
| Ex 14 | 29.3 | 165 | 117 | 132 |
| Comp | 28.9 | 189 | 139 | 123 |
| Ex 15 | 34.7 | 342 | 161 | 165 |
| Comp | 36.6 | 278 | 146 | 159 |

Having described the invention that which is claimed is:

1. A two part room temperature vulcanizable silicone composition consisting essentially of a catalyzed component or part, component (A), and a water containing component or part, component (B);

wherein component (A) comprises:
(A)(1) 100 parts by weight of an alkoxy endcapped polydiorganosiloxane of formula 1:

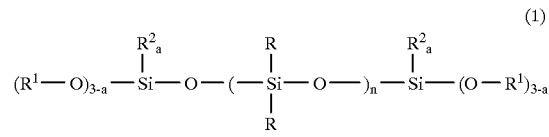

where each R and $R^2$ is independently a substituted or unsubstituted $C_{1-15}$ monovalent hydrocarbon radicals, $R^1$ is a $C_{1-8}$ aliphatic organic radical selected from the group consisting of alkyl radicals, alkyl ether radicals, alkylketone radicals, alkylcyano radicals, and a $C_{7-13}$ aralkyl radical; n is a whole number ranging from about 50 to 2500 and a is zero or one, having a viscosity ranging from about 100 to 500,000 centipoise at 25° C.;

(A)(2) from about 0.25 parts by weight to about 0.75 parts by weight per 100 parts by weight of (A)(1), as described by formula 1, of a condensation curing catalyst; and (C)(1) from slightly great than zero to about 5 parts by weight per 100 parts by weight of polymer (A)(1), as described by formula 1, of a polyalkoxysilane crosslinking agent of formula 2:

where $R^4$ is a substituted or unsubstituted $C_{1-15}$ monovalent hydrocarbon radical, each $R^3$ is a $C_{1-8}$ aliphatic organic radical selected from the group consisting of alkyl radicals, alkyl ether radicals, alkylketone radicals, alkylcyano radicals, and a $C_{7-13}$ aralkyl radical and a is zero or one; and wherein component (B) comprises:

(B)(1) 100 parts by weight of a di silanol endstopped polydiorganosiloxane of formula 3:

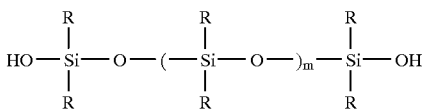

where each R is independently a substituted or unsubstituted $C_{1-15}$ monovalent hydrocarbon radicals selected from the group consisting of alkyl radicals, alkyl ether radicals, alkylketone radicals, alkylcyano radicals and $C_{7-13}$ aralkyl radicals; m is a whole number ranging from about 50 to 2500 and a is zero or one, having a viscosity ranging from about 100 to 500,000 centipoise at 25° C.;

wherein the ratio of the volume of component (A) to the volume of component (B) ranges from about 4 volumes of component (A) to about 1 volume of component (B) to about 1 volume of component (A) to about 4 volumes of component (B).

2. The composition of claim 1 wherein component (A) further comprises:
(A)(3) from about 10 to 40 parts by weight of a treated reinforcing fumed silica filler per 100 parts by weight of polymer described by formula 1 defining said subcomponent (A)(1).

3. The composition of claim 2 wherein component (B) further comprises:
(B)(3) from about zero to 40 parts by weight of a treated reinforcing fumed silica filler per 100 parts by weight of polymer described by formula 3 defining subcomponent (B)(1).

4. The composition of claim 3 wherein component (A) further comprises:
(A)(4) from about zero to 100 per 100 parts by weight of polymer described by formula 1 defining subcomponent (A)(1) of a non-reinforcing filler.

5. The composition of claim 4 wherein said non-reinforcing filler, (A)(4), is selected from the group consisting of alkali metal carbonates and sulfates, alkaline earth metal carbonates and sulfates, $TiO_2$, $Fe_2O_3$, ZnO, MgO, $Al_2O_3$, $Al(SO_4)_3$, $SiO_2$, diatomaceous earth, and organic and siloxane resins.

6. The composition of claim 4 wherein component (B) further comprises: (B)(4) from about zero to 100 parts by weight per 100 parts by weight of polymer described by formula 3 defining sub-component (B)(1) of a non-reinforcing filler selected from the group consisting of alkali metal carbonates and sulfates, alkaline earth metal carbonates and sulfates, $TiO_2$, $Fe_2O_3$, ZnO, MgO, $Al_2O_3$, $Al(SO_4)_3$, $SiO_2$, diatomaceous earth, and organic and siloxane resins.

7. The composition of claim 1 wherein component (B) further comprises:
(B)(2) from about 0.02 to about 0.1 parts by weight of water per 100 parts of polymer described by formula 3 defining sub-component (B)(1).

8. A two part room temperature vulcanizable silicone composition consisting essentially of a catalyzed component or part, component (A), and a water containing component or part, component (B);

wherein component (A) comprises:
(A)(1) 100 parts by weight of an alkoxy endcapped polydiorganosiloxane of formula 1:

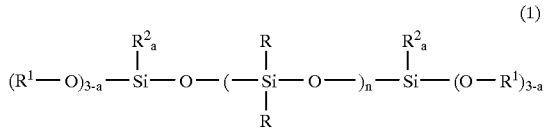

where each R and R² is independently a substituted or unsubstituted $C_{1-15}$ monovalent hydrocarbon radicals, $R^1$ is a $C_{1-8}$ aliphatic organic radical selected from the group consisting of alkyl radicals, alkyl ether radicals, alkylketone radicals, alkylcyano radicals, and a $C_{7-13}$ aralkyl radical; n is a whole number ranging from about 50 to 2500 and a is zero or one, having a viscosity ranging from about 100 to 500,000 centipoise at 25° C.;

(A)(2) from about 0.25 parts by weight to about 0.75 parts by weight per 100 parts by weight of (A)(1), as described by formula 1, of a condensation curing catalyst; and wherein component (B) comprises:

(B)(1) 100 parts by weight of a di silanol endstopped polydiorganosiloxane of formula 3:

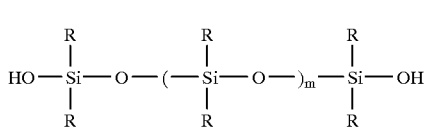

where R is a substituted or unsubstituted $C_{1-15}$ monovalent hydrocarbon radicals selected from the group consisting of alkyl radicals, alkyl ether radicals, alkylketone radicals, alkylcyano radicals and $C_{7-13}$ aralkyl radicals; m is a whole number ranging from about 50 to 2500 and a is zero or one, having a viscosity ranging from about 100 to 500,000 centipoise at 25° C.;

(C)(1) from slightly great than zero to about 5 parts by weight per 100 parts by weight of polymer (B)(1), as described by formula 3, of a polyalkoxysilane crosslinking agent of formula 2:

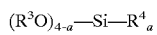 (2)

where $R^4$ is a substituted or unsubstituted $C_{1-15}$ monovalent hydrocarbon radical, each $R^3$ is a $C_{1-8}$ aliphatic organic radical selected from the group consisting of alkyl radicals, alkyl ether radicals, alkylketone radicals, alkylcyano radicals, and a $C_{7-13}$ aralkyl radical and a is zero or one; and wherein component (B) comprises:

wherein the ratio of the volume of component (A) to the volume of component (B) ranges from about 4 volumes of component (A) to about 1 volume of component (B) to about 1 volume of component (A) to about 4 volumes of component (B).

9. The composition of claim 5 wherein component (A) further comprises:

(A)(3) from about 10 to 40 parts by weight of a treated reinforcing fumed silica filler per 100 parts by weight of polymer described by formula 1 defining said sub-component (A)(1).

10. The composition of claim 9 wherein component (B) further comprises:

(B)(3) from about zero to 40 parts by weight of a treated reinforcing fumed silica filler per 100 parts by weight of polymer described by formula 3 defining sub-component (B)(1).

11. The composition of claim 10 wherein component (A) further comprises: (A)(4) from about zero to 100 per 100 parts by weight of polymer described by formula 1 defining sub-component (A)(1) of a non-reinforcing filler.

12. The composition of claim 11 wherein said non-reinforcing filler, (A)(4), is selected from the group consisting of alkali metal carbonates and sulfates, alkaline earth metal carbonates and sulfates, $TiO_2$, $Fe_2O_3$, ZnO, MgO, $Al_2O_3$, $Al(SO_4)_3$, $SiO_2$, diatomaceous earth, and organic and siloxane resins.

13. The composition of claim 11 wherein component (B) further comprises: (B)(4) from about zero to 100 parts by weight per 100 parts by weight of polymer described by formula 3 defining sub-component (B)(1) of a non-reinforcing filler selected from the group consisting of alkali metal carbonates and sulfates, alkaline earth metal carbonates and sulfates, $TiO_2$, $Fe_2O_3$, ZnO, MgO, $Al_2O_3$, $Al(SO_4)_3$, $SiO_2$, diatomaceous earth, and organic and siloxane resins.

14. The composition of claim 8 wherein component (B) further comprises:

(B)(2) from about 0.02 to about 0.1 parts by weight of water per 100 parts of polymer described by formula 3 defining sub-component (B)(1).

15. A two part room temperature vulcanizable silicone composition consisting essentially of a catalyzed component or part, component (A), and a water containing component or part, component (B);

wherein component (A) comprises:

(A)(1) 100 parts by weight of an alkoxy endcapped polydiorganosiloxane of formula 1:

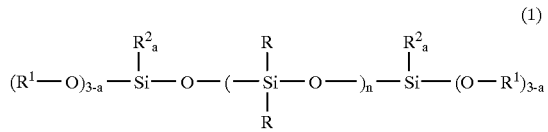

where each R and R² is independently a substituted or unsubstituted $C_{1-15}$ monovalent hydrocarbon radical, $R^1$ is a $C_{1-8}$ aliphatic organic radical selected from the group consisting of alkyl radicals, alkyl ether radicals, alkylketone radicals, alkylcyano radicals, and a $C_{7-13}$ aralkyl radical; n is a whole number ranging from about 50 to 2500 and a is zero or one, having a viscosity ranging from about 100 to 500,000 centipoise at 25° C.;

(A)(2) from 0.25 parts by weight to about 0.75 parts by weight per 100 parts by weight of (A)(1), as described by formula 1, of a condensation curing catalyst; and (A)(6) from slightly greater than zero to about 5 parts by weight per 100 parts of polymer (A)(1), as described by formula 1, of a polyalkoxysilane crosslinking agent of formula 2:

 (2)

where $R^4$ is independently a substituted or unsubstituted $C_{1-15}$ monovalent hydrocarbon radicals, each $R^3$ is a $C_{1-8}$ aliphatic organic radical selected from the group consisting of alkyl radicals, alkyl ether radicals, alkylketone radicals, alkylcyano radicals, and a $C_{7-13}$ aralkyl radical and a is zero or one;

wherein component (B) comprises:

(B)(1) 100 parts by weight of a di silanol endstopped polydiorganosiloxane of formula 3:

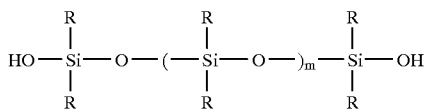

where each R is independently a substituted or unsubstituted $C_{1-15}$ monovalent hydrocarbon radical selected from the group consisting of alkyl radicals, alkyl ether radicals, alkylketone radicals, alkylcyano radicals and $C_{7-13}$ aralkyl radicals; m is a whole number ranging from about 50 to 2500 having a viscosity ranging from about 100 to 500,000 centipoise at 25° C.;

(B)(5) from slightly greater than zero to about 5 parts by weight per 100 parts of polymer (B)(1), as described by formula 3, of a polyalkoxysilane crosslinking agent of formula 2:

where each $R^4$ is a substituted or unsubstituted $C_{1-15}$ monovalent hydrocarbon radical, $R^3$ is a $C_{1-8}$ aliphatic organic radical selected from the group consisting of alkyl radicals, alkyl ether radicals, alkylketone radicals, alkylcyano radicals, and a $C_{7-13}$ aralkyl radical and a is zero or one;

wherein the ratio of the volume of component (A) to the volume of component (B) ranges from about 4 volumes of component (A) to about 1 volume of component (B) to about 1 volume of component (A) to about 4 volumes of component (B).

16. The composition of claim 15 wherein component (A) further comprises:

(A)(3) from about 10 to 40 parts by weight of a treated reinforcing fumed silica filler per 100 parts by weight of polymer described by formula 1 defining said sub-component (A)(1).

17. The composition of claim 16 wherein component (B) further comprises:

(B)(3) from about zero to 40 parts by weight of a treated reinforcing fumed silica filler per 100 parts by weight of polymer described by formula 3 defining sub-component (B)(1).

18. The composition of claim 17 wherein component (A) further comprises: (A)(4) from about zero to 100 parts by weight per 100 parts by weight of polymer described by formula 1 defining sub-component (A)(1) of a non-reinforcing filler.

19. The composition of claim 18 wherein said non-reinforcing filler, (A)(4), is selected from the group consisting of alkali metal carbonates and sulfates, alkaline earth metal carbonates and sulfates, $TiO_2$, $Fe_2O_3$, ZnO, MgO, $A_2O_3$, $Al(SO_4)_3$, $SiO_2$, diatomaceous earth, and organic and siloxane resins.

20. The composition of claim 18 wherein component (B) further comprises: (B)(4) from about zero to 100 parts by weight per 100 parts by weight of polymer described by formula 3 defining sub-component (B)(1) of a non-reinforcing filler selected from the group consisting of alkali metal carbonates and sulfates, alkaline earth metal carbonates and sulfates, $TiO_2$, $Fe_2O_3$, ZnO, MgO, $Al_2O_3$, $Al(SO_4)_3$, $SiO_2$, diatomaceous earth, and organic and siloxane resins.

21. The composition of claim 15 wherein the ratio of the volume of component (A) to the volume of component (B) ranges from about 2 volumes of component (A) to about 1 volume of component (B) to about 1 one volume of component (A) to about 1 volumes of component (B).

22. The composition of claim 21 wherein the ratio of the volume of component (A) to the volume of component (B) is about 1 volume of component (A) to about 1 volume of component (B).

23. The composition of claim 15 wherein component (B) further comprises:

(B)(2) from about 0.02 to about 0.1 parts by weight of water per 100 parts of polymer described by formula 3 defining sub-component (B)(1).

* * * * *